Patented Oct. 10, 1944

2,360,204

UNITED STATES PATENT OFFICE 2,360,204

DIHYDRO RESIN ACIDS AND METHOD FOR PREPARING

Richard F. B. Cox, Wilmington, Del., assignor to Hercules Powder Company, Wilmington, Del., a corporation of Delaware No Drawing. Application December 31, 1943, Serial No. 516,511

10 Claims. (Cl. 260—100)

This invention relates to new compositions of matter and a method for their preparation. More particularly it relates to new dihydro resin acids having unique chemical properties and a method for their preparation.

Numerous dihydroabietic acids have been described in the art ranging in optical rotation from $(\alpha)_D$ —23° to +108° and in melting points from 141° to 218° C. Also dihydro-1-pimaric acids have been described ranging in optical rotation from $(\alpha)_D$+24° to +35° and in melting points from 135° to 144° C. Most of these dihydro resin acids have been shown to be convertible to an individual lactone melting at 131° to 132° C. and known as the lactone of hydroxytetrahydroabietic acid. The dihydro resin acids heretofore known have been obtained by fractional crystallization of hydrogenated natural resin acids.

Now in accordance with this invention it has been found that heretofore unknown dihydro resin acids of the empirical formula $C_{20}H_{32}O_2$ may be produced by treating a resin acid lactone having an empirical formula of $C_{20}H_{32}O_2$ with an organometallic compound and recovering the dihydro resin acids from the reaction mixture. Thus, it has been found that by treatment of the lactone of hydroxytetrahydroabietic acid with an organometallic compound such as a Grignard reagent, heretofore unknown dihydro resin acids are formed, and may be recovered from the reaction mixture.

Now having indicated in a general way the nature and purpose of the invention the following examples illustrate the invention in detail. All parts expressed in the examples represent parts by weight unless otherwise indicated.

Example 1

16.6 parts of methyl magnesium iodide were prepared by combining 15 parts of methyl iodide and 2.3 parts of magnesium in 50 parts of ether. To this Grignard solution were gradually added 30.4 parts of the lactone of hydroxytetrahydroabietic acid (melting point 131°–132° C.) dissolved in 100 parts of dry benzene. When the addition was complete, the mixture was heated for 5 hours on a steam bath. The product was then poured into 200 parts of ice water containing 25 parts of ammonium chloride. The benzene layer was then extracted with 300 parts of 2% sodium hydroxide solution, this extract acidified, and the acids recovered by filtration, dried, and weighed. The yield was 21 parts (69%). This reaction product consisting of a mixture of dihydroabietic acids was characterized by having a specific rotation $(\alpha)_D$ of +29° (2% in ethyl alcohol) and a neutral equivalent of 295. It was found that this mixture of dihydroabietic acids comprised 62.5% of an acid having a specific rotation of $(\alpha)_D$+68° and melting point 147°–148° C., and 37.5% of an acid having a specific rotation $(\alpha)_D$ of —36° and melting point 185°–186° C.

Example 2

To 16.6 parts of methyl magnesium iodide prepared as in Example 1, were added 15.2 parts of the lactone of hydroxytetrahydroabietic acid (M. P. 131°–132° C.) in 50 parts dry benzene. The same procedure was followed as in Example 1 and the product consisting of a mixture of dihydroabietic acids was separated. The yield was 8.0 parts (52%), the specific rotation $(\alpha)_D$+32° (2% in ethyl alcohol), and the neutral equivalent 295. The product was found to be made up of 65% of the dihydroabietic acid of specific rotation $(\alpha)_D$+68° and 35% of the dihydroabietic acid $(\alpha)_D$—36°.

Example 3

To 166 parts of methyl magnesium iodide in 525 parts of ether were slowly added 304 parts of the lactone of hydroxytetrahydroabietic acid melting at 131°–132° C. in 880 parts of dry benzene. After standing 1 hour the mixture was warmed on a steam bath under reflux for 16 hours. At the end of this time all of the reagent had been used up. The reaction mixture was washed with 1500 parts of 5% ammonium chloride and then with water. The ether and benzene were distilled off to give a brownish product. This was crystallized from acetone yielding three fractions:

(1) Lactone, melting point 131°–132° C.
(2) An acid, melting point 145°–150° C.
(3) An acid, melting point 185°–186° C.

The acid melting at 145°–150° C. weighed about twice as much as the higher melting acid. The acids were further purified by conversion to their sodium salts in alcohol followed by dilution with water to allow material other than the salts of the acids to precipitate. After filtering and acidification, the acids were again isolated and recrystallized from ethyl acetate. The purified low melting acid melted at 147°–148° C. and had a specific rotation (2% in ethyl alcohol) $(\alpha)_D$ of +68°. The carbon and hydrogen content and equivalent weight calculated on the basis of the empirical formula $C_{20}H_{32}O_2$ were C, 79.0%; H, 10.6%; equivalent weight, 304. Actual analysis produced the following data: C, 78.7%, 78.9%;

H, 10.45%, 10.47% and equivalent weight 305.5. It was unsaturated to tetranitromethane and lactonized readily in sulfuric acid to the lactone of hydroxytetrahydroabietic acid (M. P. 131°–132° C.).

The high melting acid was recrystallized from ethyl acetate to a constant rotation. Its melting point was then 185°–186° C. and its specific rotation $(\alpha)_D$ was $-36°$ (2% in ethyl alcohol). It was unsaturated as shown by testing with tetranitromethane and lactonized in sulfuric acid to the lactone of hydroxytetrahydroabietic acid (M. P. 131°–132° C.). Its neutral equivalent was 304 which is exactly that for a dihydroabietic acid.

Example 4

To 18.3 parts of methyl magnesium iodide in 52.5 parts of dry ether were added 30.4 parts of the lactone of hydroxytetrahydroabietic acid (M. P. 131°–132° C.) in 90 parts of dry benzene. The solutions were kept below 30° C. during the addition of the lactone and the resulting mixture allowed to stand at about 30° C. for 16 hours. The product was then washed with 200 parts of 5% ammonium chloride solution and then with water and evaporated to dryness at about 25° C. The residue amounted to 29.6 parts and an extraction with 250 parts of a 2% solution of sodium hydroxide in alcohol yielded a mixture of the salts of the dihydroabietic acids. After acidification the acids amounted to 3 parts.

Example 5

The reaction of the lactone of hydroxytetrahydroabietic acid with methyl magnesium iodide was repeated exactly as in Example 4 except that the mixture was heated 5 hours at 80° C. instead of being allowed to stand 16 hours at about 30° C. The dry crude product amounted to 33 parts and yielded on extraction with alcoholic sodium hydroxide 11.4 parts of the mixture of the two dihydroabietic acids. These were readily crystallized into the dextro and levo acids as described in Example 3.

Example 6

A solution of methyl magnesium iodide was made by combining 2.5 parts of magnesium and 15.6 parts of methyl iodide in 80 parts of phenetole. To this reagent in a nitrogen atmosphere in a closed vessel fitted with a gas evolution device were added 30.4 parts of the lactone of hydroxytetrahydroabietic acid (M. P. 131°–132° C.) in 90 parts of dry benzene. The reaction mixture was heated by a boiling water bath for 1½ hours. After the heating period, the addition of ethyl alcohol caused no gas evolution showing that the reagent had all reacted. The reaction mixture was washed and the solvent removed as was done in Example 3. The product was then extracted with 250 parts of a 2% alcoholic solution of sodium hydroxide to isolate 13.4 parts of a mixture of the dihydroabietic acids of which about 9 parts melted at 147°–148° C. and the remainder melted at 185°–186° C.

Example 7

A solution of ethyl magnesium iodide was made by combining 2.5 parts of magnesium and 16.5 parts of ethyl iodide in 80 parts of phenetole. To this solution was added 30.4 parts of the lactone of hydroxytetrahydroabietic acid melting at 131°–132° C. in 100 parts of dry benzene and the solution was heated for 16 hours at 100° C. After this heating period, the reaction mixture was washed with 250 parts of 5% ammonium chloride solution and then with water. The solvents were removed by steam distillation. The residue was extracted with 250 parts of 2% sodium hydroxide solution. On acidification of the alkaline extract, a mixture of resin acids precipitated having a specific rotation $(\alpha)_D+28°$ (2% in ethyl alcohol). This mixture was subjected to fractional crystallization from ethyl acetate to yield dihydroabietic acid melting at 147°–148° C., $(\alpha)_D+68°$ (2% in ethyl alcohol) and dihydroabietic acid melting at 185°–186° C., $(\alpha)_D-36°$ (2% in ethyl alcohol).

The lactone of hydroxytetrahydroabietic acid which is useful in the process of this invention may be prepared according to the method disclosed in U. S. Patent 2,225,246 to Torsten Hasselstrom. This method involves the treatment of a dihydroabietic acid with concentrated sulfuric acid under conditions which promote sulfonation at a temperature range of about $-5°$ C. to about 50° C., treating the resultant product to remove sulfonation products and other water-soluble bodies therefrom, and leaving an insoluble residue, treating this insoluble residue with aqueous caustic alkali to produce a second insoluble residue which is the crude lactone of hydroxytetrahydroabietic acid. This may or may not be further purified for use in the present invention. Although the above process for the production of the lactone of tetrahydroabietic acid is a convenient one, the source of this lactone is not limited to such process for use in the present invention.

While methyl magnesium iodide was used in the examples of the invention other organometallic compounds are operable also. Thus, methyl magnesium bromide, methyl magnesium chloride, dimethyl zinc, ethyl magnesium iodide, ethyl magnesium bromide, etc., may be used. Methyl Grignard reagents are preferred, while the ethyl Grignard reagents are also very desirable. In general the only Grignard reagents useful in the process of this invention are those containing not more than two carbon atoms.

In carrying out the process of this invention the reaction solvent may be any solvent which does not react irreversibly with the organometallic compound such as ether, benzene, toluene, xylene, dioxane, phenetole, isopropyl ether, and the like. Although in the examples ether and phenetole were used in the preparation of the Grignard reagent these or other ether solvents are not essential during the reaction herein disclosed.

The organometallic compound may be used in greater or less than equimolar amounts with the lactone of hydroxytetrahydroabietic acid. However it is preferable not to use an excess since it apparently does not increase the yield.

While a temperature range of about 80° to 100° C. is preferred for the reaction between the Grignard reagent and lactone of hydroxytetrahydroabietic acid as shown by the examples, temperatures between about 30° and 150° C. may be used.

The length of the reaction time is not critical and may be from about ½ to about 24 hours depending on the temperature and other conditions employed. In the preferred temperature range, 2 to 5 hours reaction time were found to be the most useful.

In removing the metallic ions resulting from decomposition of the organometallic compound during the reaction, any agent acidic in nature may be used to convert any hydroxide of the metal present to the metal salts and to decompose any metal salts of the dihydroabietic acids that might be present providing that such an agent is without effect upon the dihydroabietic acids and will render the inorganic salts soluble. Although ammonium chloride solution was used in the examples, other acidic materials such as aqueous hydrochloric or aqueous sulfuric acids could have been used. This treatment may be followed by washing the reaction product with water to remove inorganic material.

Further separation of the dihydro resin acids from the reaction product may be accomplished by converting the dihydro resin acids to corresponding salts. Agents useful for this purpose are inorganic hydroxides such as sodium, potassium, lithium, calcium, barium, aluminum, silver, copper, and ammonium hydroxides. Also alkaline salts may be used such as sodium bicarbonate, sodium carbonate, potassium bicarbonate, potassium carbonate, and the like. The separation may be accomplished by extraction where the salts of the dihydroabietic acids are water-soluble, or by crystallization where the salts of the dihydroabietic acids are water-insoluble. In the examples described, the dihydroabietic acids were converted to their sodium salts with sodium hydroxide and the separation carried out by extraction. The dihydroabietic acids may be regenerated by acidifying the solution of their salts.

After crystallizing the two dihydroabietic acids from a suitable solvent such as ethyl acetate, acetone, or alcohol, it is possible to separate the large stubby prisms of the lower melting acid from the small needles of the higher melting acid by screening or other means of physical separation. By this method, separation and purification may be accomplished quite readily.

Both of the dihydroabietic acids prepared according to the process of this invention are stable to air but are oxidized slowly with neutral 2% potassium permanganate solution. Both of these acids are also stable toward isomerization in 1% alcoholic hydrochloric acid and in boiling glacial acetic acid. Both of these dihydroabietic acids have the characteristic of reacting with halogens to give halogenated lactones, and with nitrosyl chloride to give from the low melting dextrorotatory acid, an oximinolactone and to give from the high melting levorotatory acid a blue nitrosolactone. The reaction of these dihydroabietic acids with nitrosyl chloride offers an excellent method of analyzing for these acids in mixtures since the oximinolactone is extremely insoluble and forms readily while the nitrosolactone is quite blue. Neither the oximinolactone nor the nitrosolactone can be detected when nitrosyl chloride is added to hydrogenated rosin, rosin from saponified methyl ester of rosin, hydrogenated abietic acid, hydrogenated 1-pimaric acid, or individual dihydro resin acids crystallized from the mixtures. These new dihydroabietic acids therefore have not been present in previous dihydroabietic acid mixtures or compositions.

The final products of the process of this invention, thus, are two new dihydroabietic acids of unique chemical properties, one having a melting point of 147°–148° C. and a specific rotation $(\alpha)_D$ of $+68°$ (2% in alcohol) while the other one melts at 185°–186° C. and has a specific rotation $(\alpha)_D$ of $-36°$ (2% in alcohol). These acids are useful for synthesis. For example, the nitroso and oximino lactones can be produced and then be reduced to the corresponding aminolactones.

What I claim and desire to protect by Letters Patent is:

1. A process for producing dihydro resin acids of the formula $C_{20}H_{32}O_2$ which comprises treating a resin acid lactone having the formula $C_{20}H_{32}O_2$ with a Grignard reagent containing not more than two carbon atoms and recovering the dihydro resin acids from the reaction mixture.

2. A process for producing dihydro resin acids of the formula $C_{20}H_{32}O_2$ which comprises treating the lactone of hydroxytetrahydroabietic acid with a Grignard reagent containing not more than two carbon atoms and recovering the dihydro resin acids from the reaction mixture.

3. A process for producing dihydroabietic acids which comprises treating the lactone of hydroxytetrahydroabietic acid with a Grignard reagent, containing no more than two carbon atoms, and separating the dihydroabietic acids from the reaction mixture.

4. A process for producing dihydroabietic acids which comprises treating the lactone of hydroxytetrahydroabietic acid with a Grignard reagent containing not more than two carbon atoms for a period of about ½ to about 24 hours at a temperature from about 30° to 150° C. and separating the dihydroabietic acids from the reaction mixture.

5. A process for producing dihydroabietic acids which comprises treating the lactone of hydroxytetrahydroabietic acid with a Grignard reagent containing not more than two carbon atoms for a period of about 2 to about 5 hours at a temperature from about 80° to about 100° C. and separating the dihydroabietic acids from the reaction mixture.

6. A process for producing dihydroabietic acids which comprises treating the lactone of hydroxytetrahydroabietic acid with a methyl magnesium halide for a period of about ½ to about 24 hours at a temperature from about 30° to 150° C. and separating the dihydroabietic acids from the reaction mixture.

7. A process for producing dihydroabietic acids which comprises treating the lactone of hydroxytetrahydroabietic acid with methyl magnesium iodide for a period of about ½ to about 24 hours at a temperature of about 30° to 150° C., washing the reaction product free of magnesium salts, converting the dihydroabietic acids produced to their water-soluble salts, regenerating the acids by acidifying the water-soluble salts, separating and purifying the individual dihydroabietic acids.

8. As a new composition, a reaction product of a resin acid lactone of formula $C_{20}H_{32}O_2$ with a Grignard reagent containing not more than two carbon atoms, said reaction product comprising a mixture of two dihydroabietic acids.

9. As a new composition of matter a dihydroabietic acid melting at 147°–148° C., and having a specific rotation $(\alpha)_D$ of $+68°$ when determined in a 2% solution in alcohol.

10. As a new composition of matter a dihydroabietic acid melting at 185°–186° C., and having a specific rotation $(\alpha)_D$ of $-36°$ when determined in a 2% solution in alcohol.

RICHARD F. B. COX.